United States Patent
Valeri et al.

(10) Patent No.: US 10,816,968 B2
(45) Date of Patent: Oct. 27, 2020

(54) SYSTEM AND METHOD FOR ACCESS TO RESTRICTED AREAS BY AN AUTONOMOUS VEHICLE

(71) Applicant: GM GLOBAL TECHNOLOGY OPERATIONS LLC, Detroit, MI (US)

(72) Inventors: Frank C. Valeri, Novi, MI (US); Scott M. Reilly, Southfield, MI (US); Hussein Khalil, Dearborn Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 15/974,160

(22) Filed: May 8, 2018

(65) Prior Publication Data

US 2019/0346840 A1    Nov. 14, 2019

(51) Int. Cl.
G05D 1/00    (2006.01)
E06B 11/02    (2006.01)

(52) U.S. Cl.
CPC ............ *G05D 1/0022* (2013.01); *E06B 11/02* (2013.01); *G05D 1/0088* (2013.01)

(58) Field of Classification Search
CPC ....................................................... E06B 11/02
See application file for complete search history.

(56) References Cited

U.S. PATENT DOCUMENTS

| | | | |
|---|---|---|---|
| 9,286,741 B2 | 3/2016 | Adolfsson et al. | |
| 9,554,277 B2 | 1/2017 | G et al. | |
| 9,589,402 B2 | 3/2017 | Raina et al. | |
| 9,632,502 B1* | 4/2017 | Levinson | G05D 1/0027 |
| 9,805,533 B2 | 10/2017 | Shin et al. | |
| 10,565,804 B2* | 2/2020 | Vander Helm | G08G 1/142 |
| 2016/0189067 A1* | 6/2016 | Law | G06Q 10/06 705/34 |
| 2017/0039779 A1* | 2/2017 | Vander Helm | G08G 1/142 |
| 2017/0109949 A1* | 4/2017 | Blumer | G06F 16/583 |
| 2019/0108700 A1* | 4/2019 | Chelnik | G06F 16/22 |
| 2019/0329782 A1* | 10/2019 | Shalev-Shwartz | G06K 9/00791 |
| 2019/0392543 A1* | 12/2019 | Bautista | H04W 4/023 |

* cited by examiner

*Primary Examiner* — Alex C Dunn

(57) ABSTRACT

A system to enable restricted area entrance, including a memory configured to include one or more executable instructions; a controller configured to execute the executable instructions; a vehicle including a vehicle controls device, the vehicle configured to communicate with the controller, the vehicle controls device configured to command the vehicle to autonomously perform rideshare task(s); and the executable instructions enable the controller to receive vehicle reservation information from a mobile computing device; generate first and second vehicle identification aspects from the received vehicle reservation information, where the first and second vehicle identification aspects can be compared and, when the first and second vehicle identification aspects are determined to correspond via the comparison, an access operator can operate an access gate to enable restricted area entrance; and communicate the first vehicle identification aspect to the vehicle and the second vehicle identification aspect to the access operator.

16 Claims, 8 Drawing Sheets

SYSTEM AND METHOD FOR ACCESS TO RESTRICTED AREAS BY AN AUTONOMOUS VEHICLE

Fleet management systems employed for taxi services can deploy vehicles made available for a commercial trip. As such, when the system has delegated and deployed a vehicle for the trip, the vehicle will automatically traverse itself over to a customer location for pickup. Upon arrival, the vehicle will then taxi the customer to their desired destination, drop the customer off, and then reposition itself for parking or back to a central hub at least until the next customer trip is delegated. In certain instances, the customer is located in a restricted area such as a gated community, gated property, or sporting event. Pickup locations of this nature can create issues for the vehicle to properly arrive at the customer's location. For example, with the autonomous vehicle being empty, there will be no person to operate the entry gate to enable the vehicle to enter onto the restricted area premises and retrieve the customer. Thus, the vehicle may be forced to remain outside of the restricted area boundaries and unable to meet the customer at their preferred pickup location. It is therefore desirable to provide a system and method to enable restricted area access for an unmanned autonomous vehicle so convenient customer pickup can be accomplished.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to enable restricted area entrance, the system including: a memory configured to include one or more executable instructions; a controller configured to execute the executable instructions; a vehicle including a vehicle controls device, the vehicle configured to wirelessly communicate with the controller, the vehicle controls device configured to command the vehicle to autonomously perform one or more rideshare tasks; and where the executable instructions enable the controller to: receive vehicle reservation information from a mobile computing device; generate first and second vehicle identification aspects from at least a portion of the received vehicle reservation information, where the first and second vehicle identification aspects can be compared and, when the first and second vehicle identification aspects are determined to correspond via the comparison, an access operator can operate an access gate to enable restricted area entrance; and communicate the first vehicle identification aspect to the vehicle and the second vehicle identification aspect to the access operator. Other embodiments of this aspect include corresponding computer systems, apparatus, and computer programs recorded on one or more computer storage devices, each configured to perform the actions of the methods.

Implementations may include one or more of the following features. The system further including: the access operator being an entry device installed at the access gate; and where, when the vehicle is in proximity of the access operator, the access operator can wirelessly receive the first vehicle identification aspect from the vehicle, and where the access operator can compare the first and second vehicle identification aspects. The system further including: a security company in wireless communication with the access operator and the mobile computing device; and where, after the first and second vehicle identification aspects are compared, the security company generates a notification and sends the notification to the mobile computing device. The system further including: the access operator being a security company in wireless communication with an entry device installed at the access gate; where, when the vehicle is in proximity of the entry device, the entry device can wirelessly receive the first vehicle identification aspect from the vehicle and subsequently wirelessly communicate the first vehicle identification aspect to the access operator; and where the first and second vehicle identification aspects are compared at the access operator and, when the first and second vehicle identification aspects are determined to correspond via the comparison, the access operator can remotely control the entry device to operate the access gate to enable restricted area entrance for the vehicle. The system further including; the access operator being in wireless communication with the mobile computing device; after the first and second vehicle identification aspects are compared, the access operator generates a notification; and the access operator wirelessly communicates the notification to the mobile computing device. The system where the executable instructions enable the controller to: generate one or more vehicle instructions based at least in part on the reservation information received from the mobile computing device, where the vehicle instructions are configured to cause the vehicle controls device to command the vehicle to autonomously perform the one or more rideshare tasks; and communicate the one or more vehicle instructions to the vehicle. The system where the first and second vehicle information aspects each include rideshare task details, and where the comparison of the first and second vehicle information aspects includes verifying the rideshare task details are substantially identical. The system where the rideshare task details include drop off location information, reservation time information, vehicle identification number (VIN) information, rideshare system user information, a unique mobile device identifier, or some combination thereof. The system where the first vehicle information aspect includes an acoustic key and the second vehicle information aspect includes an acoustic passcode, where the comparison of the first and second vehicle information aspects includes a handshake between the acoustic key and passcode. Implementations of the described techniques may include hardware, a method or process, or computer software on a computer-accessible medium.

One general aspect includes a system to enable restricted area entrance, the system including: a memory configured to include one or more executable instructions; a controller configured to execute the executable instructions; a security company in wireless communication with an entry device installed at an access gate and a mobile computing device; a vehicle including a vehicle controls device, the vehicle configured to wirelessly communicate with the controller, the vehicle controls device configured to command the vehicle to autonomously perform one or more rideshare tasks; where the executable instructions enable the controller to: receive vehicle reservation information from a mobile computing device; generate first and second vehicle identification aspects from at least a portion of the received vehicle reservation information, where the first and second vehicle identification aspects can be compared at the security company and, when the first and second vehicle information aspects are determined to correspond via the comparison, the entry device can operate the access gate to enable restricted area entrance; communicate the first vehicle identification aspect to the vehicle and the second vehicle identification aspect to the security company; where, when the vehicle is in proximity of the entry device, the entry device can wirelessly receive the first vehicle identification aspect from the vehicle and subsequently wirelessly communicate the first vehicle identification aspect to the security company; and where the first and second vehicle identification aspects are compared at the security company, and where, when the first and second vehicle identification aspects are determined to correspond with each other, the security company can remotely command the entry device to operate the access gate. Other embodiments of this aspect include corresponding computer systems, apparatus, and computer programs recorded on one or more computer storage devices, each configured to perform the actions of the methods.

Implementations may include one or more of the following features. The system where, after the access operator has compared the first and second vehicle identification aspects, the security company generates a notification and wirelessly communicates the notification to the mobile computing device. The system where the executable instructions enable the controller to: generate one or more vehicle instructions based at least in part on the reservation information received from the mobile computing device, where the vehicle instructions are configured to cause the vehicle controls device to command the vehicle to autonomously traverse to a location in proximity of the access gate during performance of the one or more rideshare tasks; and communicate the one or more vehicle instructions to the vehicle. The system where the first and second vehicle information aspects each include rideshare task details, and where the comparison of the first and second vehicle information aspects includes verifying the rideshare task details are substantially identical. The system where the rideshare task details include drop off location information, reservation time information, vehicle identification number (VIN) information, rideshare system user information, a unique mobile device identifier, or some combination thereof. The system where the first vehicle information aspect includes an acoustic key and the second vehicle information aspect includes an acoustic passcode, where the comparison of the first and second vehicle information aspects includes a handshake between the acoustic key and passcode. Implementations of the described techniques may include hardware, a method or process, or computer software on a computer-accessible medium.

One general aspect includes a method to enable restricted area entrance, the method including: receiving (at a controller) vehicle reservation information from a mobile computing device; generating (via the controller) first and second vehicle identification aspects from at least a portion of the received vehicle reservation information, where the first and second vehicle identification aspects can be compared via a handshake process, and where an access operator will operate an access gate to enable restricted area entrance upon the handshake process establishing the first and second vehicle identification aspects correspond to each other; and wirelessly communicating (via the controller) the first vehicle identification aspect to the vehicle and the second vehicle identification aspect to the access operator. Other embodiments of this aspect include corresponding computer systems, apparatus, and computer programs recorded on one or more computer storage devices, each configured to perform the actions of the methods.

Implementations may include one or more of the following features. The method further including: when the vehicle is in proximity of the access operator (via access operator) wirelessly receiving the first vehicle identification aspect from the vehicle; and wirelessly communicating (via the access operator) the first vehicle identification aspect to the access operator; comparing (via the access operator) the first and second vehicle identification aspects via the handshake process; and controlling (via the access operator) the access operator to operate the access gate to enable restricted area entrance for the vehicle upon the handshake process establishing the first and second vehicle identification aspects correspond to each other. The method further including; after the step of comparing the first and second vehicle identification aspects but before the step of controlling the access operator, generating (via the access operator) a notification; and wirelessly communicating (via the access operator) the notification to the mobile computing device. The method further including: generating (via the controller) one or more vehicle instructions to autonomously perform one or more rideshare tasks based at least in part on the reservation information received from the mobile computing device, where the vehicle instructions are configured to cause the vehicle controls device to command the vehicle to autonomously traverse to the access gate during performance of the one or more rideshare tasks; and wirelessly communicating to the vehicle (via the controller) the one or more vehicle instructions to the vehicle. The method where the first and second vehicle information aspects each include rideshare task details, and where the handshake process to compare the first and second vehicle information aspects includes verifying the rideshare task details are substantially identical. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
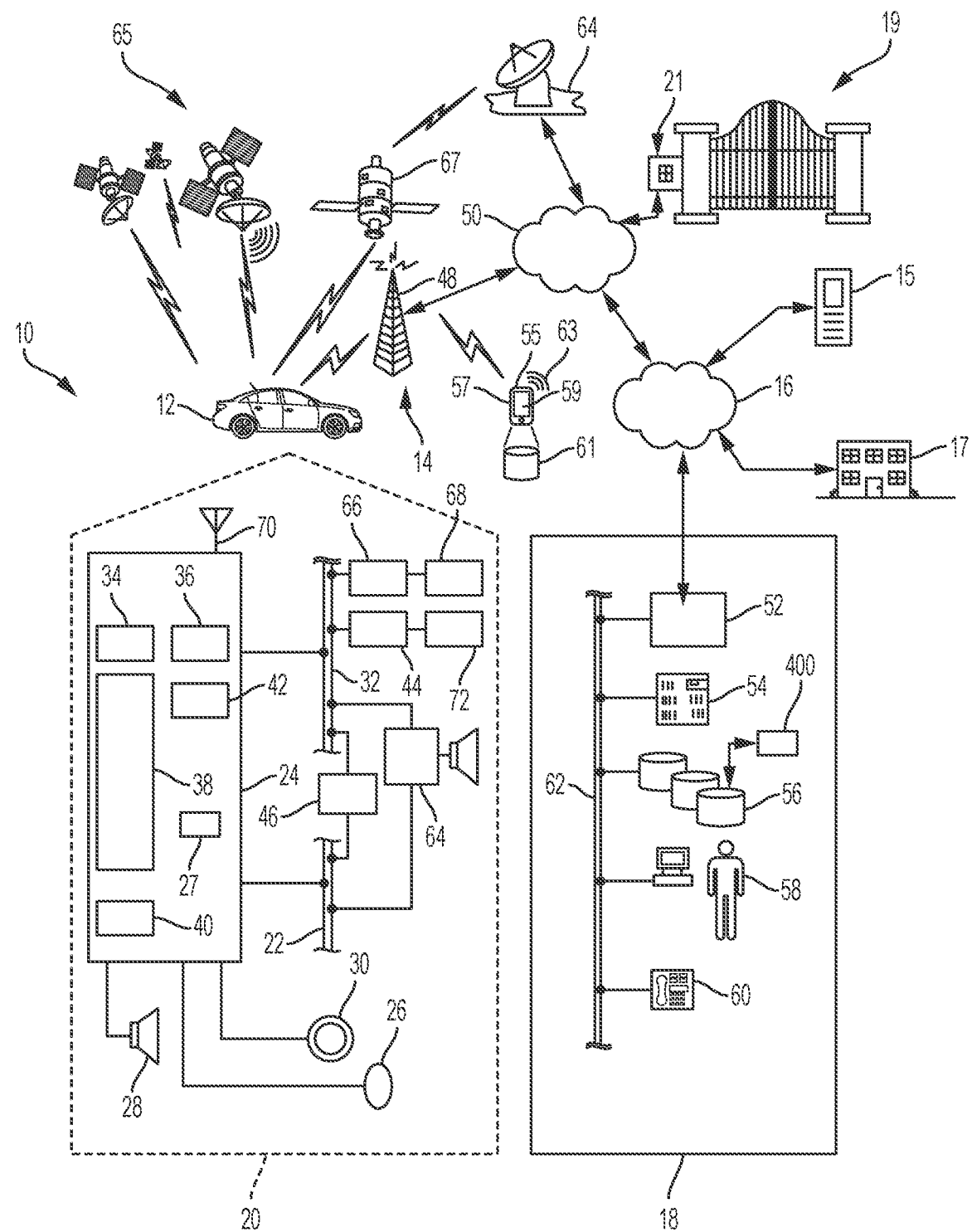
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the system disclosed herein and/or to implement examples of the methods disclosed herein. Communication system 10 generally includes a fleet of vehicles 12, a wireless carrier system 14, a land network 16, and a data center 18 (i.e., the backend). It should be appreciated that the overall architecture, setup and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Each fleet vehicle 12 may be any type of autonomous vehicle (discussed below) such as a motorcycle, car, truck, bicycle, recreational vehicle (RV), boat, plane, etc., and is equipped with suitable hardware and software that enables it to communicate over communication system 10. In certain embodiments, each vehicle 12 may include a power train system with multiple generally known torque-generating devices including, for example, one or more electric motors or traction motors that convert electrical energy into mechanical energy for vehicle propulsion.

Some of the fundamental vehicle hardware 20 for each fleet vehicle is shown generally in FIG. 1 including a telematics unit 24, a microphone 26, speaker 28, and buttons and/or controls 30 connected to telematics unit 24. Operatively coupled to telematics unit 24 is a network connection or vehicle bus 32. Examples of suitable network connections include a controller area network (CAN), a media oriented system transfer (MOST), a local interconnection network (LIN), an Ethernet, dedicated short-range communications channel (DSRC), and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communications with the data center 18, and generally includes an electronic processing device 38, one or more types of electronic memory 40, a cellular chipset/component 34, wireless modem 36, dual mode antenna 70, and navigation unit containing a GPS chipset/component 42 capable of communicating location information via a GPS satellite system 65. GPS component 42 thus receives coordinate signals from a constellation of GPS satellites 65. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS component 42), or some or all navigation services can be done via telematics unit 24, wherein the location coordinate information is sent to a remote location for purposes of providing the vehicle with navigation maps, map annotations, route calculations, and the like.

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout each fleet vehicle and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) features that provide myriad real-time data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. VSM 44 can similarly be a powertrain control module (PCM) that regulates operation of one or more components of the powertrain system. Another VSM 44 can be a body control module (BCM) that monitors and governs various electrical components located throughout the vehicle body like the vehicle's power door locks, air conditioner, tire pressure, lighting system, engine ignition, vehicle seat adjustment and heating, mirrors, and headlights. Furthermore, as can be appreciated by skilled artisans, the above-mentioned VSMs are only examples of some of the modules that may be used the vehicles 12, as numerous others are also possible.

A passive entry passive start (PEPS) module, for instance, is another of the numerous of VSMs and provides passive detection of the absence or presence of a passive physical key or a virtual vehicle key. When the passive physical key approaches, the PEPS module can determine if the passive physical key is authentic as belonging to the vehicle. The PEPS can likewise use authentication information received from data center 18 to determine if a mobile computing device 57 with virtual vehicle key is authorized/authentic to vehicle. If the virtual vehicle key is deemed authentic, the PEPS can send a command to BCM 44 permitting access to its vehicle. It should be understood that the PEPS may be an electronic hardware component connected to the vehicle bus 32 or, in an alternative embodiment, may be one or more software modules (code segments) uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with remote locations (e.g., data center 18), digital camera 55, user interface 59, and/or GPS module 63 capable of receiving GPS satellite signals and generating GPS coordinates based on those signals. User interface 59 may be embodied as a touch-screen graphical interface capable of user interaction as well as exhibiting information. Digital camera 55 may include the ability to generate bitmapped data representations of captured tangible-object images through generally known operations. Examples of the mobile computing device 57 include the iPhone™ and Apple Watch™ each being manufactured by Apple, Inc. and the Droid™ smart phone manufactured by Motorola, Inc. as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 24 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate for this to happen—upon receiving a request, data center 18 will generate an encrypted virtual vehicle key to permit vehicle access via mobile computing device 57. Data center 18 will then transmit aspects this encrypted virtual vehicle key information to both mobile computing device 57 and the PEPS module 44 via telematics unit 24. After paring has been established, mobile computing device 57 will send its virtual vehicle key aspect to telematics unit 24 for recognition in light of its stored corresponding virtual key aspect and in turn the PEPS may establish mobile computing device 57 as the key fob for the vehicle. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58 as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 56, telematics unit 24, and mobile computing device 57, remote database 441. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Computer 15 can be one of a number of computers accessible via a private or public network such as the Internet. Each such computer 15 can be used for one or more purposes, such as a web server accessible by the vehicle via wireless carrier 14. Other such accessible computers 15 can be, for example: a service center computer (e.g., a SIP Presence server) where diagnostic information and other vehicle data can be uploaded from the vehicle via the telematics unit 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with an entry device 21 (discussed below), vehicle 12, or data center 18. Computer 15 can also be used for providing Internet connectivity such as DNS services or as a network address server that uses DHCP or other suitable protocol to assign an IP address to the vehicle 12.

Security company 17 is a security operations organization (e.g., ADT™ Security Services) generally known to provide numerous personal security related services, one of which being restricted area monitoring and access control for residential and business customers located within a restricted area. Such access control may moreover be from a remote location such as a central processing center (which can act as and be set up in a comparable manner as data center 18). As follows, security company 17 may, for example, incorporate computer 15, switches, advisors, databases, and the like as well as communicate directly or indirectly with an entry device 21 installed at access gate 19 (e.g., via computer 15), discussed below, so as to temporarily provide entry to the restricted area via wireless carrier system 14.

Restricted area access gate 19 can be, for example, a hinged barrier which can temporarily allow access onto the premises of a restricted area (e.g., apartment complex, yacht club, parking garage, sporting event, etc.). In addition, access gate 19 includes an installed electronic keyless entry device 21 which controls access to the premises of the restricted area by unlocking and opening gate 19. Furthermore, in order to gain access to the restricted area, a credential is required to be transmitted to entry device 21 (discussed below), entry device 21 then verifies the received credential information to grant or deny the presented request. As follows, when access is denied, the door remains locked. If the credential is verified as authentic and approved, however, entry device 21 operates a relay that in turn unlocks and opens access gate 19. Entry device 21 is often configured to provide feedback such as, for example, a flashing red LED for access being denied and a flashing green LED for access being granted.

Database 56 could be designed to store numerous application program interface (API) suites. Moreover, in certain instances, these API suites may be accessible to the system user, data center 18, or one or more third parties. As examples, one API suite can be a rideshare services suite that incorporates numerous rideshare system records (i.e., vehicle reservation information) each having information related to the vehicles 12 in fleet such as, but not limited to, rideshare vehicle records (e.g., vehicle identification number (VIN) information, vehicle VSM information), information related to the rideshare system user such as, but not limited to, reservation account records (e.g., user name, vehicle comfort settings information, telematics unit settings, or vehicle make-model preferences), information related to organizing vehicle reservations such as, but not limited to, reservation profile records (e.g., reservation calendar information, vehicle assignment information, temporary reservation identification information, third party contact information, etc.), and information related to fleet management (e.g., fleet vehicle feedback data, localization and mapping module data, path planning module feedback data, etc.), or any other pertinent rideshare system information. The records can moreover be copied, organized, and/or stored in a tabular form to allow for continuous, real-time updates. The records can additionally collaborate with a reservation account (discussed below) for support of, for example, reservation management.

The user of mobile computing device 57 may create their own personalized vehicle reservation account to be stored in mobile memory 61 and which may have access to the rideshare records at the backend. The user may perform tasks to create this account through a variety of frontend devices such as, for example, through a remote computer and mobile computing device 57. This reservation account may be uploaded to or accessible on server 54 (i.e., to support backend functions). Data center 18 may also access one or more additional remote servers and/or remote databases (e.g., Department of Motor Vehicles, weather databases, traffic databases, etc.) to receive information in support of the reservation account as well as a particular reservation and one or more rideshare system records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account as a software module therefrom. The reservation account may moreover include one or more prompts to instruct the user to provide information (e.g., validating data) to support account creation.

Reservation account may also provide one or more prompts to assist a rideshare system user in reserving a fleet vehicle by operatively accessing and communicating with the backend rideshare system records (for the purposes of obtaining transportation to certain destinations). Once a reservation is made, mobile computing device 57 will transmit this reservation information to one or more of the rideshare records for updates thereto. At the backend, server 54 will collaborate with database 56 and one or more of the rideshare system records to establish a subset of the fleet available for reservation. To illustrate, for example, server 54 can manage the use of a fleet of twenty (20) vehicles in a particular geographic location and determine that five (5) of those vehicles are available to carryout the requested reservation as a rideshare system task. Server 54 will then select one of those fleet vehicles using a vehicle identifier and assign that identifier to the reservation account and corresponding rideshare records for use during the requested reservation. Server 54 then communicates provided pickup coordinates and provided drop-off coordinates to the selected fleet vehicle via its telematics unit 24 so the vehicle can direct itself to the pickup location, pick the user up, and traverse the user to the drop-off coordinates (i.e., to carryout a rideshare task). As vehicles are requested and used, server 54 can determine the identities of the vehicles currently in use and monitor various aspects of the other fleet vehicles so as to understand which vehicles are available at any particular time. This monitoring process may thus be conducted through review of one or more rideshare records. It should be understood that an exemplary rideshare task may be considered one in which the delegated fleet vehicle is commanded to retrieve a rideshare system user for the purpose of taxiing that user from the first specified destination (pickup location) to a subsequent second specified destination selected by the rideshare system user (drop-off location).

Autonomous Vehicle Aspects

Figure 2:
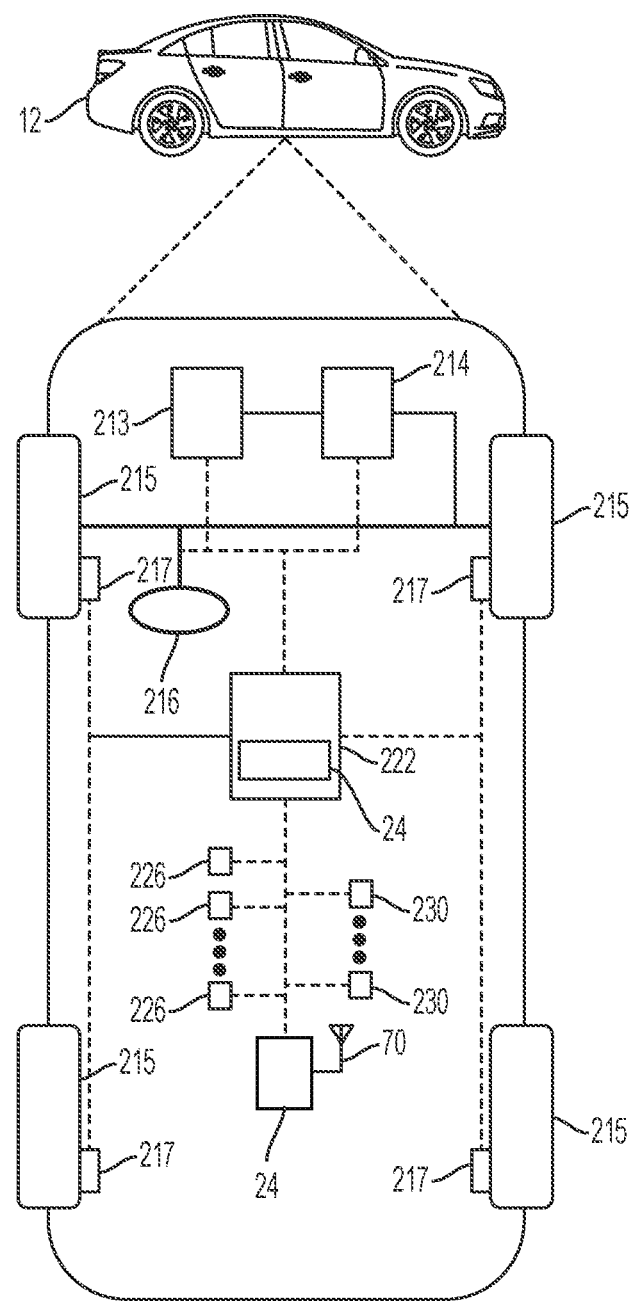
FIG. 2 is a schematic diagram of an autonomously controlled vehicle, according to an embodiment of the communications system of FIG. 1.

With reference to FIG. 2, each fleet vehicle 12 can be an autonomous vehicle (AV) that generally includes a transmission 214 which may be installed to transmit power from propulsion system 213 to vehicle wheels 215 according to selectable speed ratios. According to various embodiments, transmission 214 may include a step-ratio automatic transmission, a continuously-variable transmission, or other appropriate transmission. Fleet vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. It should be understood transmission 214 does not necessarily need to be installed for propulsion system 213 to propel fleet vehicle 12.

Each fleet vehicle 12 additionally includes a steering system 216. While depicted as including a steering wheel for illustrative purposes, in some contemplated embodiments, the steering system 216 may not include a steering wheel. Telematics unit 24 is additionally configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, this communication system communicates via at least one dedicated short-range communications (DSRC) channel. DSRC channels refer to one-way or two-way short-range to medium-range wireless communication channels specifically designed for automotive use and a corresponding set of protocols and standards.

The propulsion system 213 (explained above), transmission 214, steering system 216, and wheel brakes 217 are in communication with or under controls device 222. Vehicle controls device 222 includes an automated driving system (ADS) 224 for automatically controlling various actuators in the vehicle. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, motors 219, steering system 216, and wheel brakes 217 to control vehicle acceleration, steering, and braking, respectively, without human intervention via a plurality of actuators 230 in response to inputs from a plurality of driving sensors 226, which may include GPS, RADAR, LIDAR, optical cameras, thermal cameras, ultrasonic sensors, and/or additional sensors as appropriate.

Figure 3:
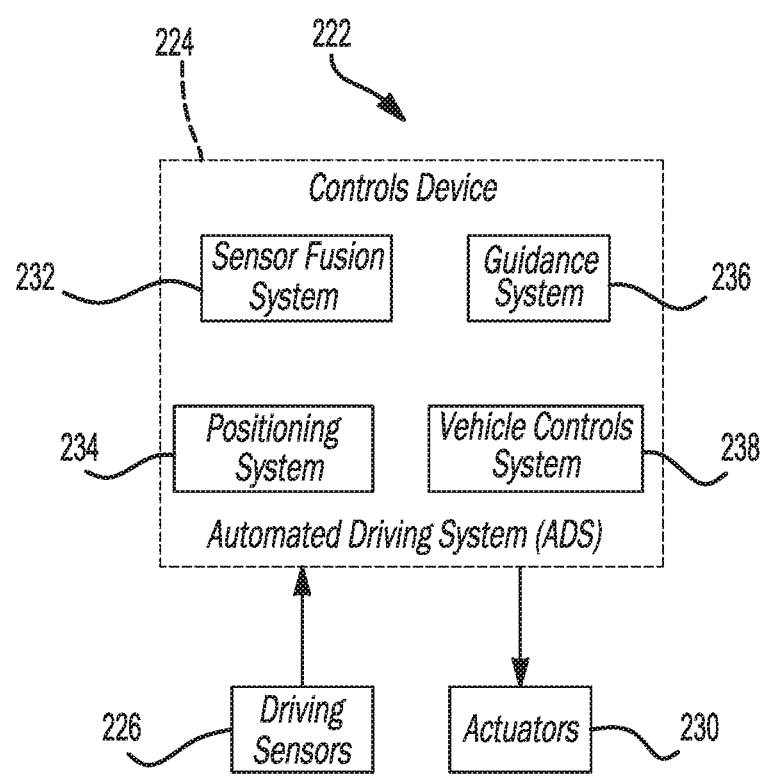
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, lidars, radars, and/or any number of other types of sensors. In one or more exemplary embodiments described herein, the sensor fusion system 232 supports or otherwise performs the ground reference determination processes and correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 232 provided to the vehicle control system 238 (e.g., indicia of detected objects and/or their locations relative to the vehicle 10) reflects or is otherwise influenced by the calibrations and associations between camera images, lidar point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

Controls device 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controls device 222 in controlling the vehicle. In various embodiments, the vehicle controls device 222 implements machine learning techniques to assist the functionality of the vehicle controls device 222, such as feature detection/classification, obstruction mitigation, route traversal, mapping, sensor integration, ground-truth determination, and the like.

The output of vehicle controls device 222 is communicated to actuators 230. In an exemplary embodiment, the actuators 230 include a steering control, a shifter control, a throttle control, and a brake control. The steering control may, for example, control a steering system 216 as illustrated in FIG. 2. The shifter control may, for example, control a transmission 214 as illustrated in FIG. 2. The throttle control may, for example, control a propulsion system 213 as illustrated in FIG. 2. The brake control may, for example, control wheel brakes 217 as illustrated in FIG. 2.

Keyless Entry Device

Figure 4:
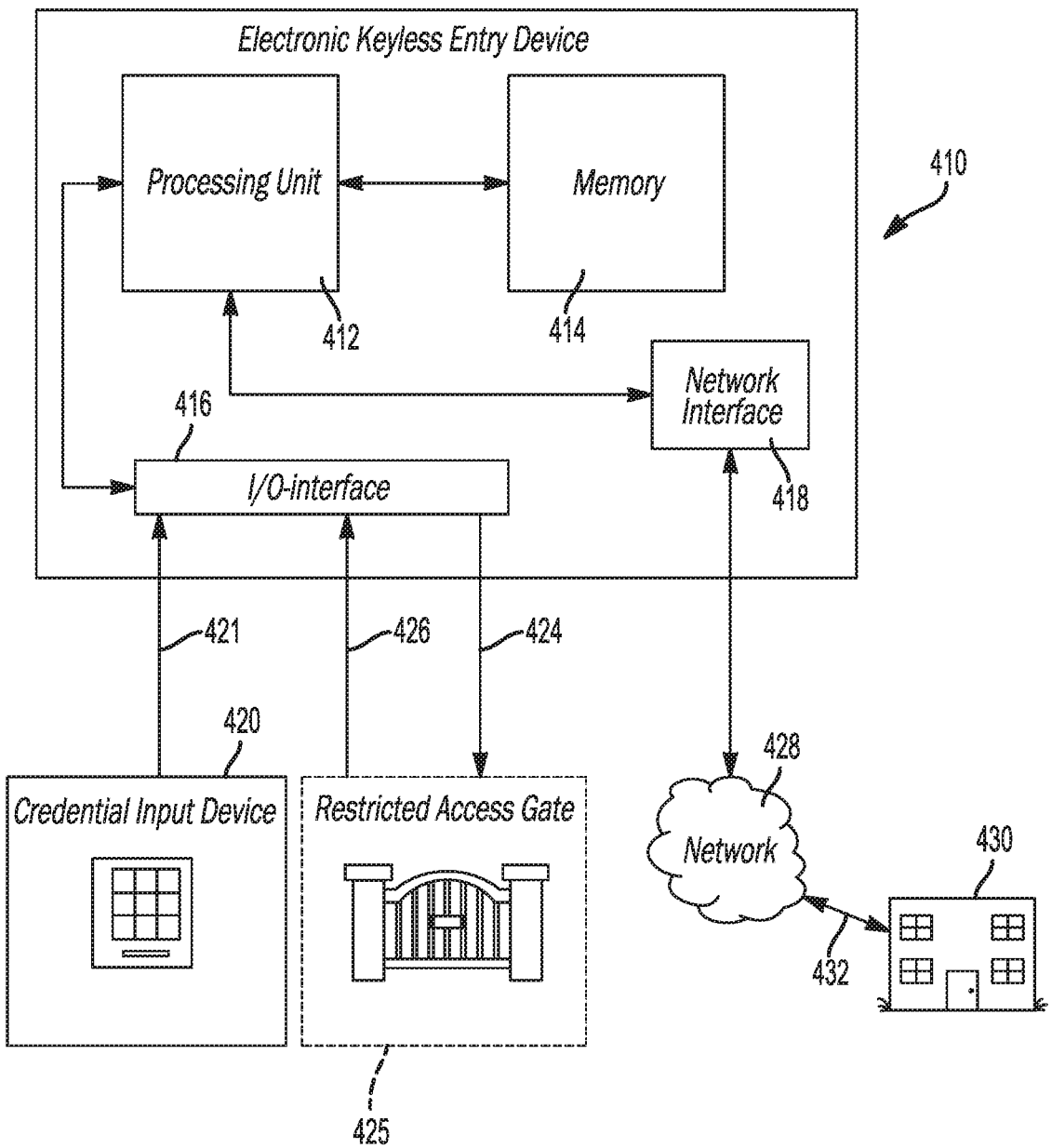
FIG. 4 is a schematic block diagram of an exemplary entry device according to one aspect of the system and method presented herein.

Turning now to FIG. 4, there can be seen an exemplary embodiment of the electronic keyless entry device 410 (disclosed in FIG. 1 as having reference number 21). As shown, entry device 410 may include a processing unit 412 that can process access related information from a memory 414. Moreover, the entry device 410 includes an I/O-interface 416 and network interface 418.

The I/O-interface 416 can receive credential information 421 (e.g., one or more vehicle identification aspects) from credential input devices 420. The credential input device 420 may be embodied as a wireless input device, for example, a SRWC receiver, an RFID reader, camera, microphone, or Near Field Communication receiver (NFC). In addition, the I/O interface 416 can review and compare the credential information 420, for example, in view of corresponding credential information previously stored in memory 414 or some form of a passcode information stored in memory 414, and then send a "pass"-signal 424 to restricted access gate 425 and to receive an entering confirmation signal 426. The entering confirmation signal 426 is a signal indicating that a vehicle or person represented by the identity signal has passed from one area to the other (i.e., into or out of the restricted area). The network interface 418 can communicate with remote parties such as, for example, security company 430 (disclosed in FIG. 1 as having reference number 17) via a network 428, (e.g., via a LAN, WAN, the Internet, etc.), using a networking technology appropriate in view of the environment of the restricted area or the requirements of the system from a security point of view. For example, security company 430 may send corresponding credential information 432 to entry device 410 via the wireless carrier system (discussed above) for storage on memory 414 and for comparison purposes by I/O interface 416 (discussed above).

Rideshare Task

Figure 5:
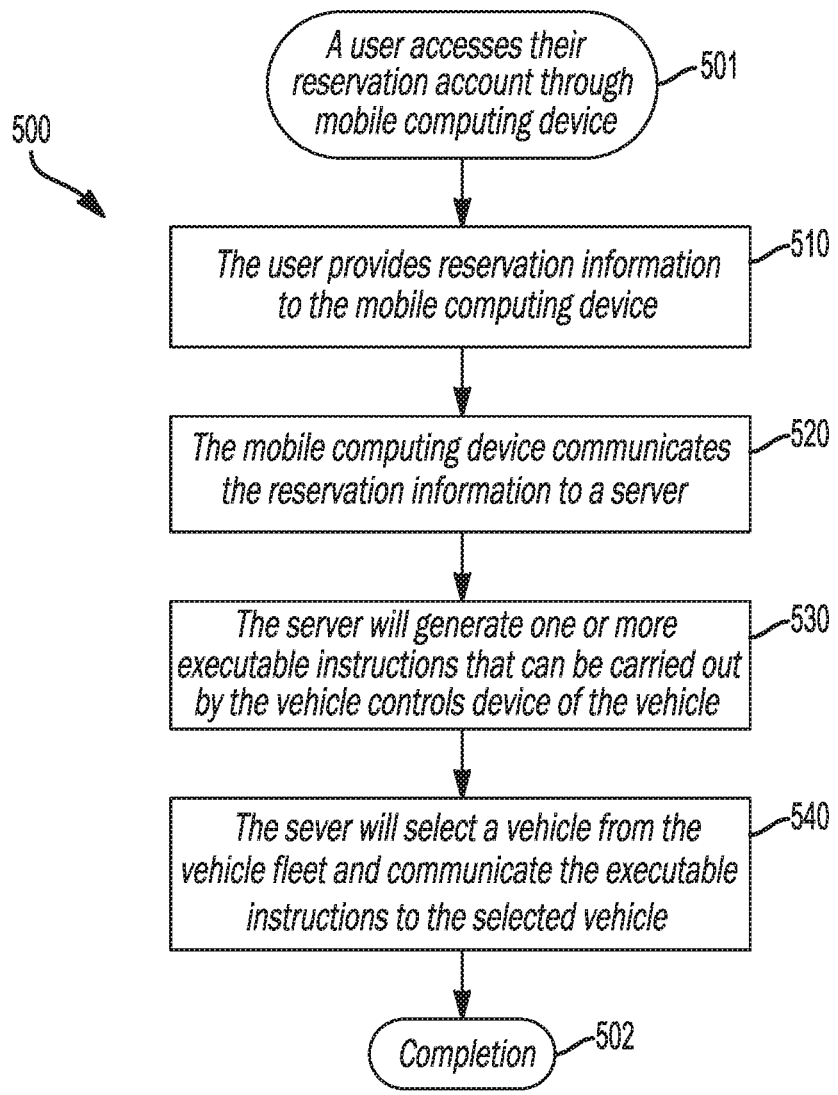
FIG. 5 is a flow chart for an exemplary methodology for the creation and carrying out of a rideshare task according to one aspect of the system and method presented herein.
Figure 6:
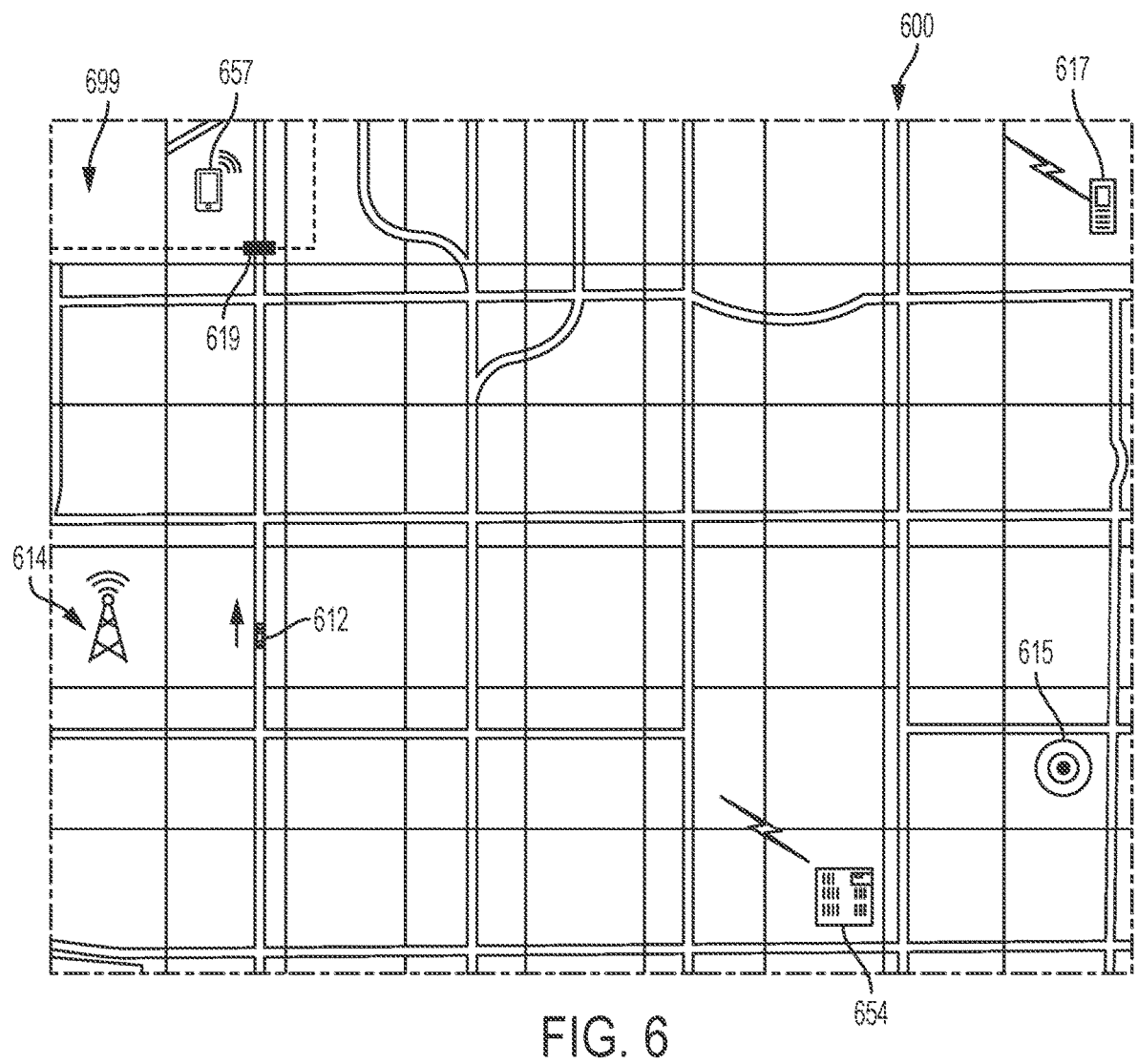
FIG. 6 is an illustrative view of the methodology for carrying out the rideshare task of FIG. 5.

Referring now to FIGS. 5 and 6, a method can be seen to illustrate the creation, establishment, and carrying out of a rideshare task in accordance with one or more aspects of a system to enable restricted area entrance. One or more aspects of method 500 may be carried out by the reservation account via the mobile computing device 657. One or more ancillary aspects of method 500 may be carried out by vehicle controls device, telematics unit 630, and vehicle 612. The method 500 begins at 501 in which a user accesses their reservation account through mobile computing device 657. In step 510, the user provides reservation information to the mobile computing device 657 (e.g., via the reservation account). This reservation information can include the pickup location of the user (e.g., the location of the mobile computing device 657 automatically established by GPS module 63), the desired drop-off location 615 (e.g., selected by the user), user information (which can alternatively be provided through one or more rideshare system records), and the unique mobile device identifier of mobile computing device 657. In step 520, upon being commanded to do so, mobile computing device 657 communicates the reservation information to server 654 which may be located at data center 18.

In step 530, based on the reservation information, server 654 will generate one or more executable instructions that can be carried out by the vehicle controls device of vehicle 612. Moreover, these executable instructions will enable vehicle controls device to command the vehicle to autonomously carryout the rideshare system task established via the mobile computing device 657. In step 540, sever 654 will select a vehicle 612 from the fleet (discussed above) and communicate the executable instructions to that vehicle 612, which may be via wireless carrier system 614. Upon the executable instructions being sent, method 500 may move to completion 502. In addition, a communication link may be established between the mobile computing device 657 and selected fleet vehicle 612 such that one or more packets of vehicle location information may be communicated to the reservation account to allow for real-time monitoring of the vehicle 612 prior to arriving at the pickup location 657.

To illustrate the effects of establishing a rideshare task through method 500, when the executable instructions are received at vehicle 612 and executed by the vehicle controls device, vehicle 612 will autonomously traverse to the pickup location 657. Upon picking up the user, vehicle 612 will then autonomously traverse to the previously selected drop off location 615. While generating the executable instructions, server 654 may also access one or more known virtual maps generated by a remote party API (e.g., computer 15 of FIG. 1) to determine if the pickup location happens to be located in a restricted area 699 such as, but not limited to, a gated community, gated property, sporting event, or recreational facility (e.g. golf course or country club). In such instances, the executable instructions will be configured such that, when executed by the vehicle controls device, the vehicle 612 will autonomously traverse to the access gate 619 of the restricted area 699. Vehicle 612 will then stop when within proximity of the access gate 619, for example, by pulling up to a location within approximately one-to-three (1-3) feet of entry device 621 (i.e., wherein the front driver-side tire is one-to-three feet from the periphery of entry device 621). Furthermore, after access gate 619 has unlocked and opened to enable restricted area entrance for vehicle 612, which may be via server 617 at the security company (not shown in FIG. 6), the executable instructions will also be configured to command vehicle 612 to continue on its path to the pickup location 657.

Method

Figure 7:
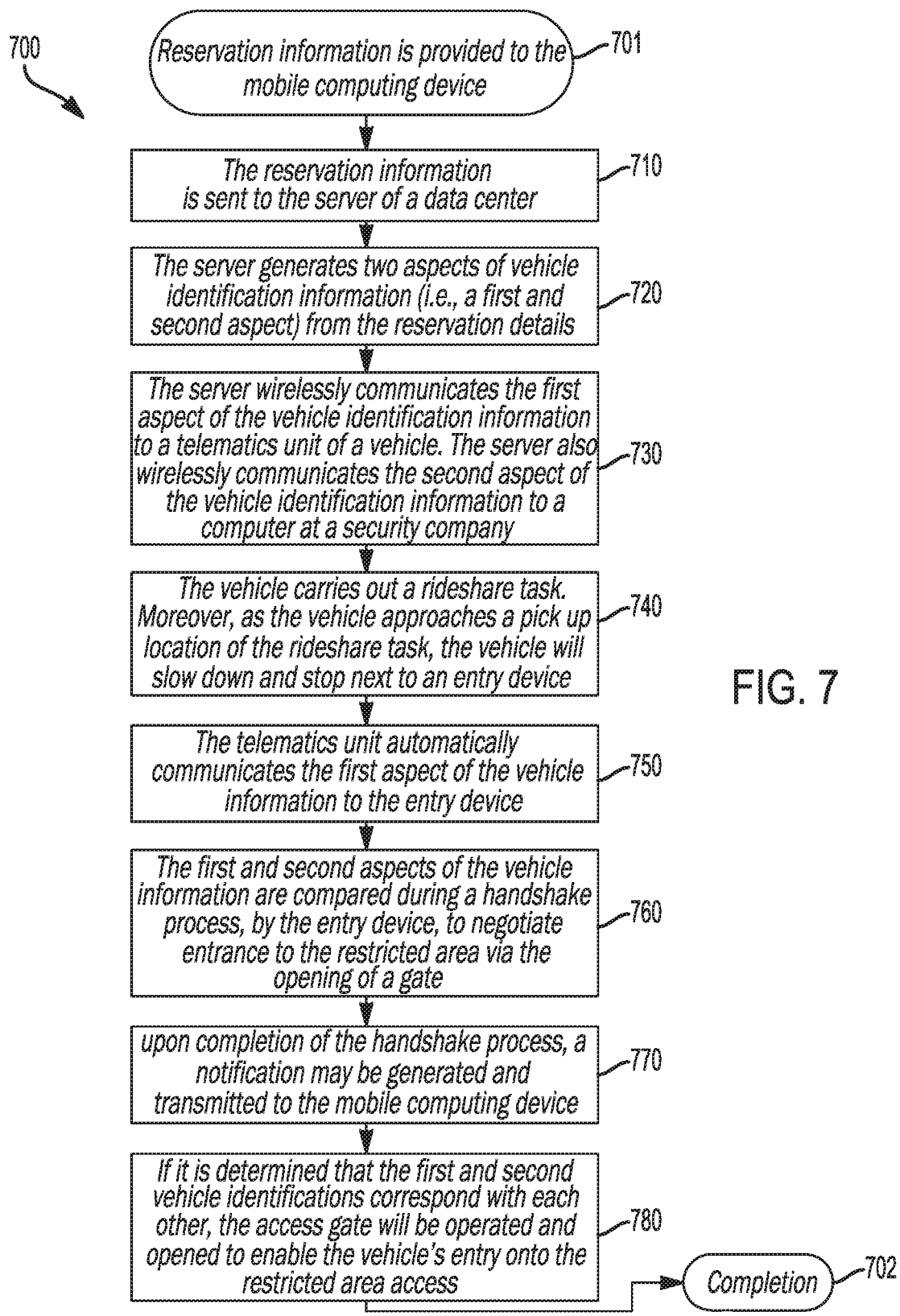
FIG. 7 is a flow chart for an exemplary methodology to enable restricted area entrance according to one aspect of the system and method presented herein.
Figure 8:
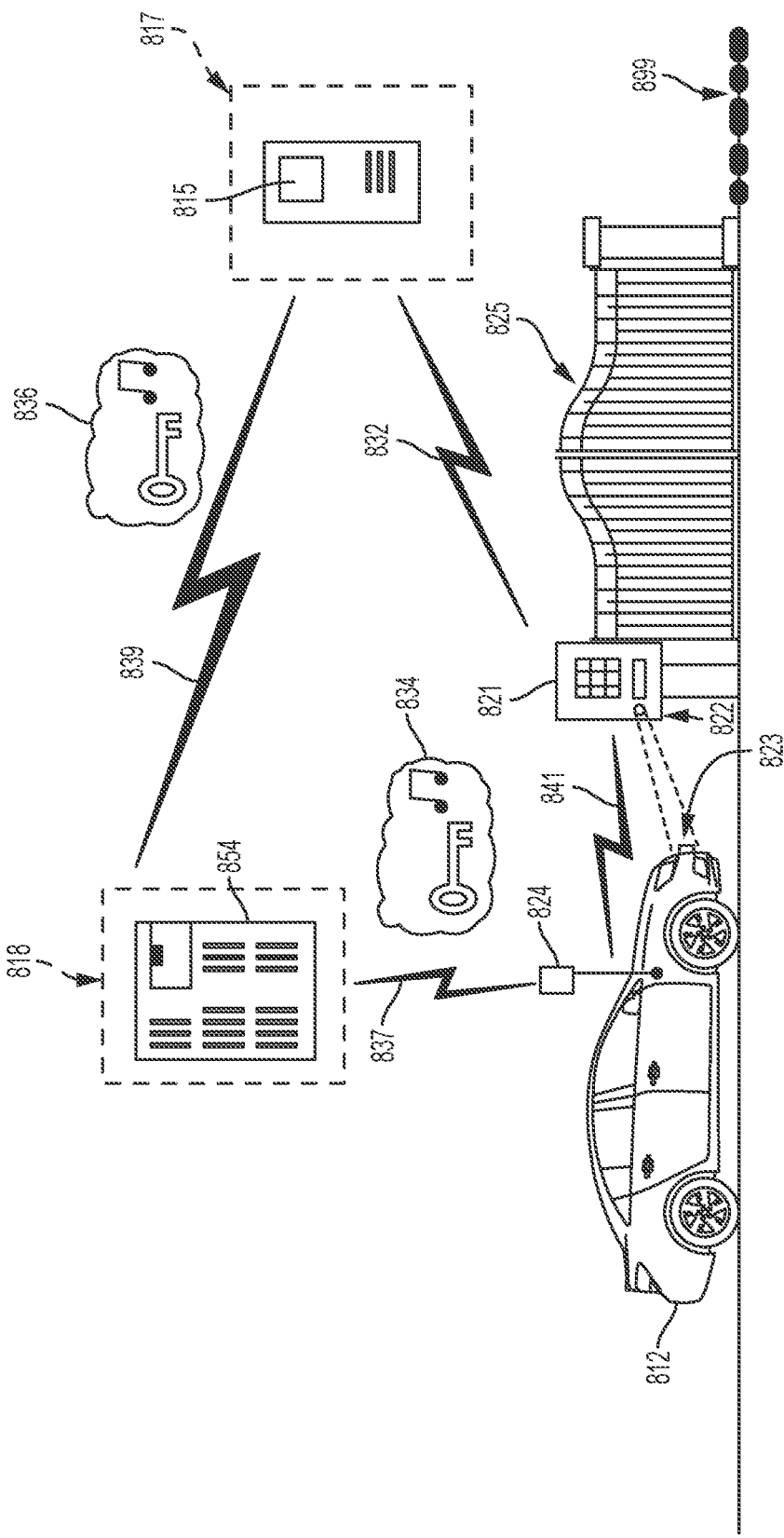
FIG. 8 is an illustrative view of the methodology of FIG. 7.

Now turning to FIGS. 7 and 8, there is shown an embodiment of a method 700 to enabled restricted area entrance. One or more aspects of the entrance method 700 may be carried out through the vehicle telematics unit 824, mobile computing device (see FIG. 1), entry device 821, one or more servers 854 installed at data center 818, and one or more computers 815 installed in security company 817. One or more ancillary aspects of method 700 may be carried out through a vehicle controls device, reservation account installed at the front end on a mobile computing device (not shown), and one or more rideshare system records installed at the back end on server 854. Skilled artisans will moreover see that telematics unit 824, data center 818, and security company 817 may be remotely located from each other.

Method 700 is supported by telematics unit 824 being preconfigured to communicate with data center 818 and entry device 821. This configuration may be made by a vehicle manufacturer at or around the time of the telematics unit's assembly or after-market (e.g., via vehicle download using the afore-described communication system (see FIG. 1) or at a time of vehicle service, just to name a couple of examples) and the communications may be cellular communications via wireless carrier system or they may be short-range wireless communications (e.g., Bluetooth, BLE, NFC, RFID, Wi-Fi, etc.). In at least one implementation, one or more executable instructions are provided to the telematics unit 824 and stored on non-transitory computer-readable medium. Method 700 is further supported by preconfiguring data center 818 to store one or more other APIs in a database, each of which being accessible via server 854. Method 700 is further yet supported by preconfiguring security company 817 to incorporate computer 815 to store and retrieve information (e.g., vehicle identification information such as rideshare task information or an acoustic key). Computer 815 may also be preconfigured to store one or more other APIs to support the storage and retrieval of such information. Method 700 is further yet supported by preconfiguring mobile computing device to activate and implement the reservation account.

Method 700 begins at 701 in which reservation information is provided to a mobile computing device (as discussed above). In step 710, this reservation information is sent to the server 854 of data center 818. This information may, for example, include details of a rideshare task such as, but not limited to, the reservation's drop off location, reservation time information (e.g., desired pick up time, desired drop off time, etc.), the vehicle identification number (VIN), rideshare system user information from one or more rideshare system records, and the unique mobile device identifier of the mobile computing device. Moreover, in this step, server 854 may analyze the pickup location and, optionally, review the location in view of one or more known virtual maps (e.g., GOOGLE™ MAPS) to determine that the pickup location is found within a restricted area.

In step 720, server 854 generates two aspects of vehicle identification information from the reservation details. In one example, server 854 creates a first version of the rideshare task details to be transmitted to and stored on the memory of telematics unit 824. In this example, server 854 also creates a second version of the rideshare task details to be transmitted over to and stored on computer 815 of security company 817. Moreover, both copies of the details can be uniquely encrypted in such a way that the encrypted details correspond with each other and are configured so that they can be compared and contrasted for validity and verification during a handshake process. As follows, during the handshake, both copies of the reservation pickup and drop off location, system user information, VIN information, license plate number information, mobile device identifier, and/or reservation time information may be compared to verify each as being identical. In another example, server 854 generates an acoustic key 834 to be sent to telematics unit 824 and an acoustic passcode 836 to be sent to computer 815. Moreover, the key 834 includes an encoded series of acoustic sounds (e.g., each sound being within the range of 23 to 54 kHz—so as to be silent to humans; shown as a music note in FIG. 8) that can be recognized by the acoustic passcode 836 during a handshake process for validity and verification.

In step 730, server 854 wirelessly communicates 837 the first aspect of the vehicle identification information to telematics unit 824. Server 854 also wirelessly communicates 839 the second aspect of the vehicle identification information to computer 815. In one or more embodiments, server 854 may send the second aspect of the information to entry device 821 instead of the security company 817 (not shown).

In step 740, vehicle 812 carries out the rideshare task. In this step, as vehicle 812 approaches the pickup location, the vehicle 812 will slow down and stop next to entry device 821 (e.g., stopping within one (1) to three (3) feet of the entry device 821; otherwise stated, at a distance in which SRWC 841 can be established between telematics unit 824 and entry device 821—as represented in FIG. 8). In step 750, telematics unit 824 automatically communicates the first aspect of the vehicle information (e.g., the encrypted rideshare details or acoustic key) to entry device 821. In one embodiment of this step, entry device 821 will act as an information relay and subsequently send the first aspect of the vehicle information over to the security company 817.

Alternatively, in step 750, a camera 822 installed on entry device 821 reads the first aspect of the vehicle information located on the vehicle and, in one or more embodiments, sends that information over to the security company 817. For example, it has been envisioned that the vehicle identification information (e.g., reservation information, system user information, etc.) may be exhibited through a display 823 somewhere on vehicle 812 (e.g., the bumper) so as to be captured by the camera 822. It has also been envisioned that this information can be dynamic and displayed in such a way that is visible to humans or it may be displayed in a way that is invisible to the human eye (e.g., via an infrared/ultraviolet light display).

In step 760, the first and second aspects of the vehicle information are compared during a handshake process to negotiate entrance to the restricted area 899 via the opening of gate 825. Depending on the embodiment, this handshake process and comparison may occur at the entry device 821 or it may occur at security company 817. Also, depending on the embodiment, this comparison may be defined as the comparing and contrasting of rideshare details for validity and verification, or it may be defined as the recognition of acoustic key 834 by acoustic passcode 836 for validity and verification, or it may be defined as the comparing and contrasting of the captured information that was exhibited on display 823.

In optional step 770, upon completion of the handshake process, a notification may be generated and transmitted to the mobile computing device of the rideshare system user. Depending on the embodiment, this notification may be generated and sent from entry device 821 or the computer 815 at security company 817. Moreover, the notification can be a text message (e.g., SMS) displayed on the mobile device user interface through the reservation account and the notification can be an indication that vehicle 812 has gained access to restricted area 899 and will be arriving shortly. The notification can also include one or more virtual prompts to allow the rideshare system user to additionally approve access to the restricted area 899 (i.e., a safeguard that establishes if this additional approval is not provided, entry device 821/computer 815 will not operate gate 825).

In step 780, upon completion of the handshake process, if it is ultimately determined that the first and second vehicle identifications correspond with each other, the access gate 825 will be operated and opened to enable the vehicle's entry onto restricted area 899. Depending on the embodiment, the access gate 825 may be directly controlled by entry device 821 or the access gate 825 may be indirectly controlled by security company 817, via remote control communications 832 sent to entry device 821. Upon the access gate 825 being opened (i.e., upon the gate doors being swung open), method 700 will move to completion 702.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to enable restricted area entrance, the system comprising:
   a memory configured to comprise one or more executable instructions;

a controller configured to execute the executable instructions;

a vehicle comprising a vehicle controls device, the vehicle configured to wirelessly communicate with the controller, the vehicle controls device configured to command the vehicle to autonomously perform one or more rideshare tasks; and wherein the executable instructions enable the controller to:

receive vehicle reservation information from a mobile computing device;

generate first and second vehicle identification aspects from at least a portion of the received vehicle reservation information, wherein the first and second vehicle identification aspects can be compared and, when the first and second vehicle identification aspects are determined to correspond via the comparison, an access operator can operate an access gate to enable restricted area entrance, and wherein the first vehicle information aspect comprises an acoustic key and the second vehicle information aspect comprises an acoustic passcode, wherein the comparison of the first and second vehicle information aspects includes a handshake between the acoustic key and passcode; and communicate the first vehicle identification aspect to the vehicle and the second vehicle identification aspect to the access operator.

2. The system of claim 1, further comprising:

the access operator being an entry device installed at the access gate; and wherein, when the vehicle is in proximity of the access operator, the access operator can wirelessly receive the first vehicle identification aspect from the vehicle, and wherein the access operator can compare the first and second vehicle identification aspects.

3. The system of claim 2, further comprising:

a security company in wireless communication with the access operator and the mobile computing device; and wherein, after the first and second vehicle identification aspects are compared, the security company generates a notification and sends the notification to the mobile computing device.

4. The system of claim 1, further comprising:

the access operator being a security company in wireless communication with an entry device installed at the access gate;

wherein, when the vehicle is in proximity of the entry device, the entry device can wirelessly receive the first vehicle identification aspect from the vehicle and subsequently wirelessly communicate the first vehicle identification aspect to the access operator; and wherein the first and second vehicle identification aspects are compared at the access operator and, when the first and second vehicle identification aspects are determined to correspond via the comparison, the access operator can remotely control the entry device to operate the access gate to enable restricted area entrance for the vehicle.

5. The system of claim 4, further comprising:

the access operator being in wireless communication with the mobile computing device;

after the first and second vehicle identification aspects are compared, the access operator generates a notification; and the access operator wirelessly communicates the notification to the mobile computing device.

6. The system of claim 1, wherein the executable instructions enable the controller to:

generate one or more vehicle instructions based at least in part on the reservation information received from the mobile computing device, wherein the vehicle instructions are configured to cause the vehicle controls device to command the vehicle to autonomously perform the one or more rideshare tasks; and communicate the one or more vehicle instructions to the vehicle.

7. The system of claim 1, wherein the first and second vehicle information aspects each comprise rideshare task details, and wherein the comparison of the first and second vehicle information aspects includes verifying the rideshare task details are substantially identical.

8. The system of claim 7, wherein the rideshare task details comprise drop off location information, reservation time information, vehicle identification number (VIN) information, rideshare system user information, a unique mobile device identifier, or some combination thereof.

9. A system to enable restricted area entrance, the system comprising:

a memory configured to comprise one or more executable instructions;

a controller configured to execute the executable instructions;

a security company in wireless communication with an entry device installed at an access gate and a mobile computing device;

a vehicle comprising a vehicle controls device, the vehicle configured to wirelessly communicate with the controller, the vehicle controls device configured to command the vehicle to autonomously perform one or more rideshare tasks;

wherein the executable instructions enable the controller to:

receive vehicle reservation information from a mobile computing device;

generate first and second vehicle identification aspects from at least a portion of the received vehicle reservation information, wherein the first and second vehicle identification aspects can be compared at the security company and, when the first and second vehicle information aspects are determined to correspond via the comparison, the entry device can operate the access gate to enable restricted area entrance, and wherein the first vehicle information aspect comprises an acoustic key and the second vehicle information aspect comprises an acoustic passcode, wherein the comparison of the first and second vehicle information aspects includes a handshake between the acoustic key and passcode;

communicate the first vehicle identification aspect to the vehicle and the second vehicle identification aspect to the security company;

wherein, when the vehicle is in proximity of the entry device, the entry device can wirelessly receive the first vehicle identification aspect from the vehicle and subsequently wirelessly communicate the first vehicle identification aspect to the security company; and wherein the first and second vehicle identification aspects are compared at the security company, and wherein, when the first and second vehicle identification aspects are determined to correspond with each other, the security company can remotely command the entry device to operate the access gate.

10. The system of claim 9, wherein, after the access operator has compared the first and second vehicle identification aspects, the security company generates a notification and wirelessly communicates the notification to the mobile computing device.

11. The system of claim 9, wherein the executable instructions enable the controller to:
generate one or more vehicle instructions based at least in part on the reservation information received from the mobile computing device, wherein the vehicle instructions are configured to cause the vehicle controls device to command the vehicle to autonomously traverse to a location in proximity of the access gate during performance of the one or more rideshare tasks; and
communicate the one or more vehicle instructions to the vehicle.

12. The system of claim 9, wherein the first and second vehicle information aspects each comprise rideshare task details, and wherein the comparison of the first and second vehicle information aspects includes verifying the rideshare task details are substantially identical.

13. The system of claim 12, wherein the rideshare task details comprise drop off location information, reservation time information, vehicle identification number (VIN) information, rideshare system user information, a unique mobile device identifier, or some combination thereof.

14. A method to enable restricted area entrance, the method comprising:
receiving, at a controller, vehicle reservation information from a mobile computing device;
generating, via the controller, first and second vehicle identification aspects from at least a portion of the received vehicle reservation information, wherein the first and second vehicle identification aspects can be compared via a handshake process, and wherein an access operator will operate an access gate to enable restricted area entrance upon the handshake process establishing the first and second vehicle identification aspects correspond to each other;
wirelessly communicating, via the controller, the first vehicle identification aspect to the vehicle and the second vehicle identification aspect to the access operator;
when the vehicle is in proximity of the access operator, at the access operator, wirelessly receiving the first vehicle identification aspect from the vehicle;
comparing, at the access operator, the first and second vehicle identification aspects via the handshake process;
generating, via the access operator, a notification;
upon the handshake process establishing the first and second vehicle identification aspects correspond to each other, via the access operator, operating the access gate to enable restricted area entrance for the vehicle; and
wirelessly communicating, via the access operator, the notification to the mobile computing device.

15. The method of claim 14, further comprising:
generating, via the controller, one or more vehicle instructions to autonomously perform one or more rideshare tasks based at least in part on the reservation information received from the mobile computing device, wherein the vehicle instructions are configured to cause the vehicle controls device to command the vehicle to autonomously traverse to the access gate during performance of the one or more rideshare tasks; and
wirelessly communicating to the vehicle, via the controller, the one or more vehicle instructions to the vehicle.

16. The method of claim 14, wherein the first and second vehicle information aspects each comprise rideshare task details, and wherein the handshake process to compare the first and second vehicle information aspects includes verifying the rideshare task details are substantially identical.

* * * * *